United States Patent Office 3,220,111
Patented Nov. 30, 1965

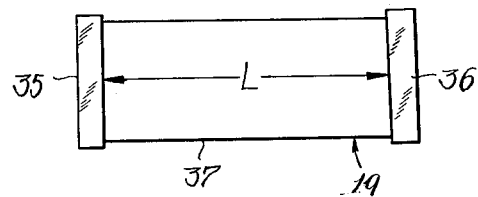
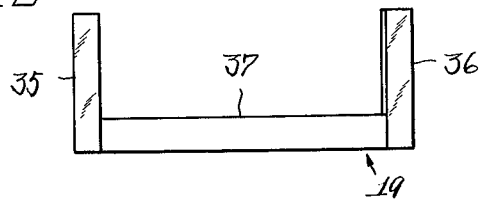
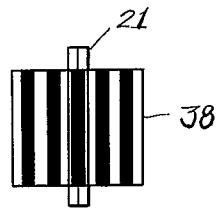

3,220,111
GRADUATING APPARATUS OF OPTICAL
INTERFERENCE TYPE
Yoshimasa Sakurai, Tokyo, Japan, assignor to The
Agency Chiyoda-Ward, Tokyo, Japan
Filed Sept. 19, 1961, Ser. No. 139,239
Claims priority, application Japan, Sept. 20, 1960,
35/38,536
2 Claims. (Cl. 33—19)

This invention relates to a graduating apparatus utilizing an optical interference system for producing graduation marks with great accuracy on a selected item.

Graduating apparatus of the general nature noted above is not new but the accuracy of the apparatus of the prior art is affected by changes of temperature and atmospheric pressure. The object of this invention is to produce an apparatus which compensates for temperature changes while it is in operation and which is insensitive to changes of atmospheric pressure.

In accordance with the invention the graduating apparatus and the optical interference systems are located in a closed chamber and the pressure of the atmosphere in the chamber is varied in accordance with the temperature effect on the item which is being graduated. The pressure of the atmosphere outside the chamber is therefore eliminated as a factor effecting the accuracy of the apparatus and the variations in the temperature of the workpiece are compensated.

The invention may be best understood by reference to the following description when read in connection with the accompanying drawings wherein:

FIG. 2 is a plan view of the interference standard unit.

FIG. 3 is an elevation view of the interference standard unit.

FIG. 4 is a partial view taken along the line 4—4 of FIG. 1.

Figure 1:
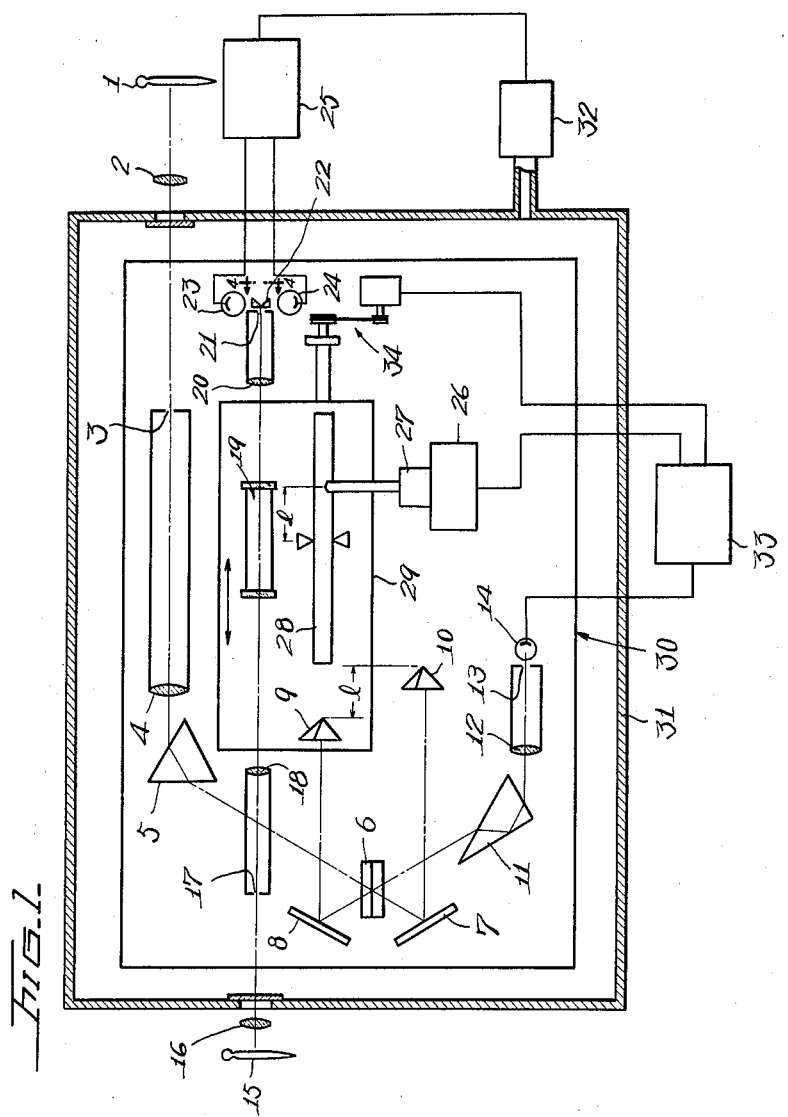
FIG. 1 is a view partly in diagram showing the general arrangement of the apparatus of this invention.

In FIG. 1, the optical parts of the interferometer used for graduation and the interference standard unit are fixed on the base 30 and the moving carriage 29 installed inside the closed container 31. This moving carriage is made so as to move on the base 30 on a straight line by means of a controllable mechanism 34. Light from a first Kr 86 light source 1 located outside the closed container is focused on slit 3 by a condensing lens 2; this light, after being formed into a flux of paralleled rays by collimator 4, is dispersed by the first dispersing prism 5, the beam then passes into the semi-transparent plane lens 6, and a first part of the beam passing through to plane mirror 7, is reflected to the fixed corner prism 10 and is returned to the lens 6 via the plane mirror 7. A second portion of the said beam of light from prism 5 is reflected by lens 6 to plane mirror 8 and is directed into the movable corner prism 9. This latter beam of light, from mirror 8 to movable prism 9, which is parallel to that above described beam from mirror 7 to the fixed corner prism 10, is reflected back from the movable corner prism 9 to the lens 6 via the plane mirror 8. Interference of the two beams takes place at the lens 6. The interference rays are reflected in the direction of the second dispersing prism II, where they are dispersed into the lens 12 which in turn focuses them upon the slit 13 and from thence they enter the photoelectric cell 14.

The size of the slits 3 and 13 is selected in conjunction with the dispersing prism to obtain monochromatic light and so that only monochromatic light falls upon the photoelectric cell 14. All of the elements of the above described optical system are fixed to the base 30 with the exception of the movable corner prism 9 which is fixed to the movable carriage 29. The direction of motion of the movable carriage 29 is parallel to the above mentioned parallel beams of light between mirror 8 and corner prism 9 and between mirror 7 and corner prism 10. 28 is the object to be graduated and it is fixed to the moving carriage at one point and the object 28 is so arranged that the surface to be graduated is parallel to the line of motion of the movable carriage 29 and the aforementioned parallel beams of light. The graduating equipment 27 is fixed on base 30 and is driven by the driving mechanism 26. The position of the graduating equipment 27 is selected so that the position of the marking scribe of 27 relative to the fixed point of the object 28 is equal to the distance between corresponding points on the corner prisms 9 and 10. The interference standard unit 19 is located on the moving carriage 29 close to the object 28 in such a manner that the interference standard unit 19 and the object 28 will always have the same temperature. Light from an Hg 198 second light source 15 is focused by condensing lens 16 upon slit 17, and is made into a flux of parallel rays of light by the collimator 18. The light caused to interfere in the interference standard unit 19 is converged by the lens 20 causing interference fringes to appear on slit 21. The parallel rays of light from the collimator 18 through the interference standard unit 19 are parallel to the direction of motion of the movable carriage 29 and the aforementioned parallel light beams to and from corner prisms 9 and 10.

The construction of the interference standard unit is shown in FIG. 2. The spacer piece 37 must have the same coefficient of expansion as the object 28; further the ends of this spacer piece are lapped plain surfaces that are not parallel for the transparent end piece 36 is at a minute angle to the transparent end piece 35 as indicated in FIG. 2. The distance between the two end pieces at their midpoint is hereinafter called the "interval L" and the means of determining this distance will be described later. An optically flat semi-transparent film is affixed to each of the end pieces 35 and 36 on the surfaces that are facing each other. These surfaces and the lapped surfaces of spacer piece 37 are closely attached to each other by means of clamps, cement or other such means. The interference fringes emanating from the slit 21 appear as shown at 38 on FIG. 4.

The light passing through the interference standard unit 19 and through the center of the slit 21 is divided by the prism 22 and the two rays are directed into the photoelectric cells 23 and 24. When the movable carriage 29 is moved ½ wavelength of the prescribed monochromatic light, such as 5649.5902 A., with the air in the closed container 31 at a defined pressure, the electric output of the photoelectric cell 14 will show a variation of one cycle. The number of changes caused by moving 1 mm. is 3540.07977 for the light given in this specification as an example. According to this invention, the wave length is changed by adjusting the air pressure to select the simplest number of changes per unit of movement of the carriage to cause a variation of spectroscopic wave length by the variation of air pressure. In this instance the simplest number is 3540. The photoelectric cell 14 has an antimony, cesium cathode and is used in an optical system using flat glass and achromatic lenses. The light from the Hg 198 light source 15, under standard conditions has a wave length of 5790.6931 A.

The lengths obtained by multiplying the wave lengths of 5 kinds of the spectrum of the above mentioned Hg 198 lamp by 1.00002253 are 0.579023$\mu$, 0.56795$\mu$, 0.54609048$\mu$, 0.4358587$\mu$ and 0.4046682$\mu$, respectively. The length of the "interval L" between end pieces 35 and 36 above to produce interference fringes of the orders 299099th, 300191th, 317169th, 397395th, and 428012th, respectively, is 86.6015 mm., at 20° C. Using a length of interval L as 86.6015 mm., the air pressure is varied until the overlapping interference fringes of the 5 kinds of spectrum produce a balance of output from photoelectric cells 23 and 24. Any difference in the output of 23 and 24 is detected and causes a current to flow through the control circuit 25 which drives the pressure adjusting mechanism 32 until the zero signal is obtained. The variable output of the photoelectric cell 14 is counted in the counter and control unit 33 as the movable carriage 29 is being moved, when the aggregate number of cycles reaches 354, the graduation mechanism 27 is operated and draws graduation marks at intervals of 0.1 mm. on the object 28.

The present specification describes an example of the invention for the purposes of the disclosure. It is however intended to cover all changes, modifications and combinations of the embodiments shown.

With these and further objects in view, as may become apparent from the within disclosure, the invention consists in the method, apparatus and structure herein pointed out, but includes further methods, apparatus and structures coming within the scope of what may be claimed.

What I claim is:

1. A graduating apparatus for applying graduation marks to an object comprising a base; a carriage mounted on the base for movement thereon; means for mounting the object to be graduated on the carriage; graduating means for graduating the object mounted adjacent the object and means for operating said graduating means to graduate the object in a predetermined pattern; said means for operating comprising means for producing a predetermined number of light pulses for a given movement of the carriage on the base; means for counting said pulses, and means responsive to a predetermined number of pulses for energizing said graduating means; a close housing enclosing said base, said carriage and said pulse producing means, and means including an interference standard unit mounted on the carriage adjacent to the object, for varying the pressure in said housing in response to a change of temperature of the object.

2. A device as claimed in claim 1 wherein the means for varying the pressure further comprises a pair of photoelectric cells and means for directing a greater amount of light to one of said cells in response to a change in temperature of the object than to the other cell.

References Cited by the Examiner

UNITED STATES PATENTS

| 2,518,647 | 8/1950 | Teeple et al. | 88—14 |
| 2,527,338 | 10/1950 | Stamm | 33—32 |
| 3,040,620 | 6/1962 | Ferris | 33—19 |

OTHER REFERENCES

Harrison, Sturgis, Baker and Storke article, Journal Optical Society of America, vol. 47 (1957), pages 15–22.

Harris and Storke article, Journal Optical Society of America, vol. 55 (1955), pages 112–121.

National Physical Laboratory (symposium #11) 1960.

Publication: "Interferometry," article by A. I. Kartashev, pages 111–117.

ISAAC LISANN, *Primary Examiner.*

L. R. PRINCE, ROBERT L. EVANS, *Examiners.*